Aug. 8, 1933.  E. C. FRITTS  1,921,517
FILM WINDING SIGNAL DEVICE
Filed Dec. 20, 1929
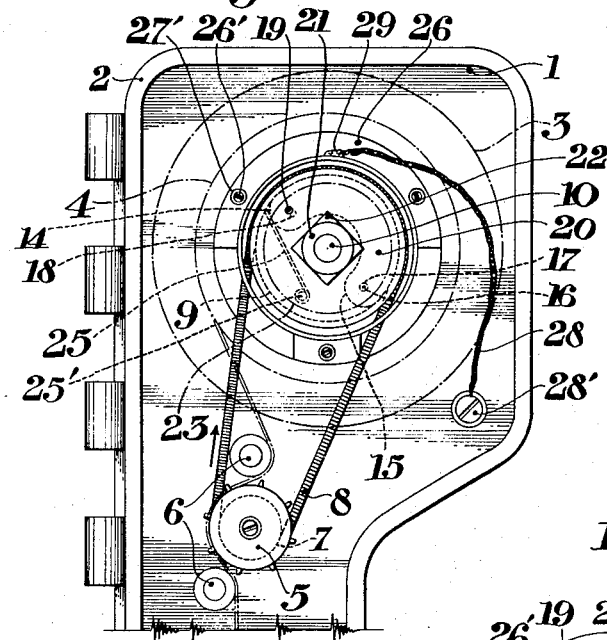
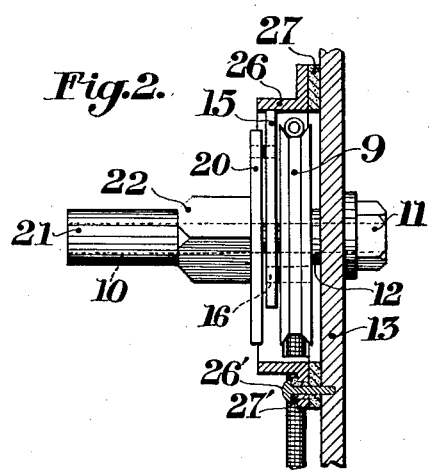
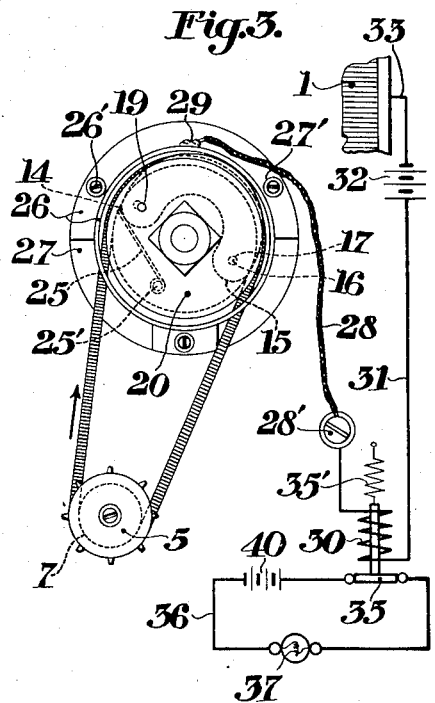
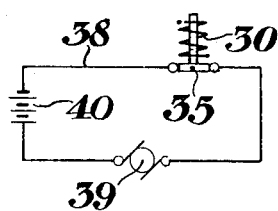
Inventor,
Edwin C. Fritts,
By
Attorneys Patented Aug. 8, 1933

1,921,517

UNITED STATES PATENT OFFICE 1,921,517

FILM WINDING SIGNAL DEVICE

Edwin C. Fritts, Rochester, N. Y., assignor to Eastman Kodak Company, Rochester, N. Y., a Corporation of New York Application December 20, 1929. Serial No. 415,463

8 Claims. (Cl. 200—52)

This invention relates to photography and more particularly to photographic cameras having signals to indicate the proper winding of the film. One object of my invention is to provide a signaling device which will call to the attention of an operator improper film take-up. Another object of my invention is to provide a signal device which will prevent the camera from being operated when the wind-up reel becomes full or when improper winding occurs. Another object of my invention is to provide a simple type of switch which will make a circuit when the winding operation is completed or when this operation fails to properly wind the film; and other objects will appear from the following specification, the novel features being particularly pointed out in the claims at the end thereof.

While features of this invention may be useful in other connections, it is particularly suitable in connection with the Duplex camera shown in my U. S. Patent No. 1,730,930 of October 8, 1929. This patent is for a camera particularly adapted for use in automatically recording machines, such as machines for photographing checks or documents. Reference may be had to this patent for details of the driving mechanism and other parts of the camera which are not necessary for a complete understanding of the present invention.

Coming now to the drawing wherein like reference characters denote like parts throughout,—

Fig. 1 is a fragmentary plan view of a portion of the camera shown in the patent above referred to equipped with a signaling device constructed in accordance with and embodying a preferred form of my invention;

Fig. 2 is a fragmentary side elevation, partly in section, of the signaling device shown in Fig. 1;

Fig. 3 is a plan view of the signaling device with an electric circuit diagrammatically shown, indicating one embodiment of my invention; and Fig. 4 is a view showing a circuit which illustrates a second embodiment of my invention.

A camera casing is shown in part at 1, this case consisting of a recessed member having a flange 2 extending around the edges thereof to form a receptacle for a film spool 3. The film spool is adapted to contain convolutions of film 4 which are moved upwardly towards the spool 3 by means of a power-driven sprocket 5, the film being held on this sprocket by means of a pair of idlers 6.

The sprocket 5 is provided wtih a grooved pulley 7 which transmits power to a spring belt 8 which moves in the direction of the arrow and extends around a grooved pulley 9 adapted to turn idly upon a shaft 10 which has an internal collar 12 and a reduced threaded portion extending through the camera wall 13 and engaging a nut 11 for secure attachment of said shaft 10 to wall 13.

A pin 16 extends from one side of the pulley 9 into an aperture 17 provided in one end of an arcuate link 15. The other end of arcuate link 15 is provided with an elongated slot 18 and a slotted end edge 14. A spring 25 is mounted on the face of pulley 9 by a stud 25' and slidably engages the slotted end edge 14 of arcuate link 15.

A disk 20 and integral square portion 22 are also mounted to freely rotate on shaft 10 with disk 20 engaging arcuate link 15. A pin 19 on disk 20 fits loosely into the elongated slot 18 in arcuate link 15. A sleeve 21 is driven onto shaft 10 to hold disk 20, link 15 and pulley 9 in lateral sliding abutment with each other. The sleeve 21 and square portion 22 constitute a square-round spindle for the film spool 3.

A flange ring 26 surrounds disk 20, link 15 and pulley 9 in spaced relation thereto and ring 26 is attached to camera wall 13 by bolts 26' but is insulated from said wall 13 by an insulating annular washer 27 and insulating sleeves 27' between bolts 26' and ring 26. A wire 28 is attached to ring 26 at 29 and leads to a post 28' which upon proper location of the camera within the recording apparatus is connected to one side of a relay 30, the other side of which is connected to a source of electrical energy, such as a battery 32, in turn grounded to the camera case 1 by a wire 33.

The pivotal movement of link 15 about pin 16 is limited by engagement of pin 19 with the outer end of elongated slot 18 and by the engagement of link 15 with flange ring 26. The loose fit between pin 19 and elongated slot 18 is sufficient to allow free movement of link 15 within the aforementioned limits, although if desired the slot 19 may be provided with a slanting side to prevent binding between pin 19 and the slot 18 due to the movement of link 15 about pin 16.

The operation of the film winding device is as follows: With no tension on the film or spring belt 8, the arcuate link 15 is held against ring 26 by spring 25 and completes the circuit through relay 30 which repels armature 35 to make a supplementary circuit 36 through a source of electrical energy 40 and signal lamp to light the same.

Movement of spring belt 8 in the direction of the arrow moves pulley 9 and pin 16 in a clockwise direction. This movement is transmitted to disk 20 and square portion 22 by arcuate link 15 and has a tendency to cause link 15 to move into a concentric position with respect to pulley 9 and disk 20. However, spring 25 overcomes this tendency, and as long as disk 20 and square portion 22 are free to rotate on shaft 10, arcuate link 15 will be held in contact with ring 26 even during rotation of disk 20 and square portion 22 to complete the circuit to relay 30.

A film spool 3 with square and round apertures respectively engaging square portion 22 and sleeve 21 is placed in position with the film threaded over sprocket 5 and idlers 6 on to the hub 23 of the film spool 3. Since the diameter of pulley 9 is greater than the diameter of pulley 7, and since the diameter of reel hub 23 is greater than the diameter of sprocket 5, there is a tendency for pulley 9 to turn film reel 3 and take up film faster than film is fed around sprocket 5 so that tension is created in the film. The slip between the belt 8 and pulleys 7 and 9 compensates in part for this difference in the surface speed of the film at the sprocket 5 and hub 23, but the friction between the belt and pulley keeps the tension in the film within predetermined values.

With the proper predetermined tension in the film, movement of pulley 9 and pin 16 in a clockwise direction draws arcuate link 15 into concentric position with respect to pulley 9 and disk 20 so that link 15 is out of contact with ring 26 and relay 30 is de-energized to allow spring 35' to raise armature 35 of relay 30 and break the circuit 36 to the signal lamp 37. The tension in the film creates a drag on square portion 22 and disk 20 so that the action of spring 25 is overcome and link 15 remains in concentric position. Thus pulley 7 drives spring belt 8 and pulley 9 to continuously take up film on film spool 3, but maintains sufficient tension in the film to overcome the action of spring 25 and keep link 15 out of contact with link 26.

It should be noted, therefore, that the release of the tension for any reason such as broken perforations in the film, film working off of the sprocket 5, exhaustion of the film supply or breakage of the film, will allow spring 25 to move link 15 into contact with link 26 to give the desired signal.

In place of the signal lamp 37 in the circuit 36, a circuit as shown in Fig. 4 may be used. Here a circuit 38 is provided which connects a motor 39 with a source of power 40, this motor being the driving means for the camera through suitable connections with the sprocket 7, such connections being fully described in my patent above referred to. The armature 35 can be raised against the force of gravity to break the circuit 38, thus stopping the operation of the camera as soon as the film winds improperly over the sprocket 7 or as soon as the film becomes exhausted and thus runs off of the sprocket 7, or if the take-up is not properly threaded.

The take-up reel 3 derives its power through the square portion 22 which in turn is moved through the segment 15. This segment not only serves as a driving member to transmit power from the pulley 9 to the disk 20 but it also serves as a switch for making a contact with the flange 26 when a tension is not exerted on a film 4. Thus any irregularity in winding of the take-up will automatically stop the source of power from which the camera is driven and notify the operator that the camera requires attention.

In the circuit shown in Fig. 3, a signal lamp 37 is lit to notify the operator.

What I claim as my invention, and desire to be secured by Letters Patent of the United States is:

1. In a film winding signal device, the combination with a shaft, a spindle member and a power drive both rotatable on said shaft, and a contact member forming one element of a switch, of a link between said spindle member and said power drive, and forming the other element of said switch, a pivotal connection and a loose pivotal connection, one between said link and said spindle member and the other between said link and said power drive.

2. In a film winding signal device, the combination with a shaft, a spindle member and a power drive both rotatable on said shaft, and a contact ring encircling said spindle member and said power drive in spaced relation thereto and forming one element of a switch, of a link loosely connected between said spindle member and said power drive to permit radial movement of said link into and out of engagement with said contact ring upon relative movement between said spindle member and said power drive.

3. In a film winding signal device, the combination with a shaft, a spindle member and a power drive both rotatably mounted on said shaft, and a contact member forming one element of a switch, of a link forming the other element of said switch, and pivotal connections between the link and said spindle member, and the link and said power drive, one of said pivotal connections being a pin and slot connection.

4. In a film winding signal device, the combination with a shaft, a spindle member and a power drive both rotatably mounted on said shaft, and a contact member forming one element of a switch, of a link forming the other element of said switch, pivotal connections between said spindle member and said power drive and the opposite ends of said link, one of said pivotal connections being a pin and slot connection, and a resilient means normally moving said link into engagement with said contact member.

5. In a winding signal device for motion picture film, the combination with a shaft, a spindle member rotatable thereon and adapted for attachment to a film reel, a pulley rotatably mounted on said shaft, a link between said spindle member and said pulley, a pivotal connection between said pulley and one end of said link and a pivotal connection between said spindle member and the other end of said link, one of said pivotal connections being loose and including a pin and slot, of a contact ring encircling said link in spaced relation thereto, a feeding sprocket rotatably mounted and adapted to engage said film and a spring belt encircling said pulley and said feeding sprocket.

6. In a winding signal device for motion picture film, the combination with a shaft, a spindle member rotatable thereon and adapted for attachment to a film reel, a pulley rotatably mounted on said shaft, a link between said spindle member and said pulley, a pivotal connection between said pulley and one end of said link and a pivotal connection between said spindle member and the other end of said link, one of said pivotal connections being loose and including a pin and slot, of a contact ring encircling said link in spaced relation thereto, a feeding sprocket rotatably mounted, less in diameter than said pulley and adapted to engage said film, and a spring belt encircling said pulley and said feeding sprocket.

7. In a winding signal device for motion picture film the combination with a shaft, a spindle member rotatable thereon and adapted for attachment to a film reel, a pulley rotatably mounted on said shaft, a link between said spindle member and said pulley, a pivotal connecton between said pulley and one end of said link and a pivotal connection between said spindle member and the other end of said link, one of said pivotal connections being loose and including a pin and slot, of a contact ring encircling said link in spaced relation thereto, a resilient means normally holding said link in engagement with said contact ring, a feeding sprocket rotatably mounted, less in diameter than said pulley and adapted to engage said film, and a spring belt encircling said pulley and said feeding sprocket whereby the spring belt opposes the resilient means and predominates when there is a predetermined tension in the film.

8. In a film winding signal device, the combination with a shaft, a spindle member and a pulley both rotatably mounted on said shaft, and a contact ring encircling said spindle member and said pulley in spaced relation thereto, and forming one element of a switch, of an arcuate link adapted to be concentric with said shaft, and pivotal connections between the link and said spindle member and between the link and said pulley, one of said pivotal connections being a pin and slot connection.

EDWIN C. FRITTS.